United States Patent [19]

Stambaugh et al.

[11] Patent Number: 5,406,709
[45] Date of Patent: Apr. 18, 1995

[54] GARDEN TOOL

[75] Inventors: Jack R. Stambaugh, Portland; Bruce D. Spangrud, Beaverton, both of Oreg.

[73] Assignee: Lawn Shark Inc., Lake Oswego, Oreg.

[21] Appl. No.: 880,517

[22] Filed: May 8, 1992

[51] Int. Cl.[6] .............................................. B26B 9/00
[52] U.S. Cl. .................................. 30/315; 30/355; 30/357
[58] Field of Search ................. 30/315, 314, 355, 356, 30/357

[56] References Cited

U.S. PATENT DOCUMENTS

| | | | |
|---|---|---|---|
| 10,072 | 4/1882 | Weymouth | 30/355 |
| 64,442 | 5/1867 | Nelson . | |
| 82,641 | 9/1868 | Ripley | 30/315 |
| 397,692 | 2/1889 | Clark | 30/355 |
| 592,961 | 11/1897 | Brooks | 30/355 |
| 656,093 | 8/1900 | Caruthers . | |
| 802,308 | 10/1905 | Olson . | |
| 816,236 | 3/1906 | Kline . | |
| 902,983 | 11/1908 | Manahan . | |
| 955,050 | 4/1910 | Bresnahan | 30/355 |
| 1,263,949 | 4/1918 | Singer . | |
| 1,388,547 | 8/1921 | Burns | 30/357 |
| 1,710,039 | 4/1929 | Bauer | 30/355 |
| 2,787,058 | 4/1957 | Vogel | 30/355 |
| 2,795,045 | 6/1957 | Taylor | 30/314 |
| 3,367,704 | 10/1965 | Kleppin . | |
| 4,086,699 | 5/1978 | Olkkola . | |
| 4,203,210 | 5/1980 | Hadlick, Jr. . | |
| 4,334,583 | 6/1982 | Parker . | |
| 4,411,320 | 10/1983 | Hass | 30/315 |
| 4,678,220 | 7/1987 | Gabriel . | |

Primary Examiner—Richard K. Seidel
Assistant Examiner—Hwei-Siu Payer
Attorney, Agent, or Firm—William A. Birdwell & Associates

[57] ABSTRACT

A bladed tool for use as a sod cutter, for breaking up the soil in gardens and as an edger. An elongate handle is attached to a blade having first, second and third edges which generally define a triangle. The handle is attached to the blade immediately adjacent the first edge so as to extend away from the second edge substantially parallel to the first edge. A plurality of serrations are disposed along the third edge. The serrations are preferably separated by grooves formed in the face of the blade, extending substantially parallel to the first edge, and grooves terminating at the third edge in respective notches. The serrations are about as wide or wider than the notches and the tips of the serrations are relatively wide in relation to the notches. Each serration has a leading edge and a trailing edge, the trailing edge having a portion substantially parallel to the first edge and a portion near the tip thereof which is beveled on one side of the blade so as to form a cutting edge. The intersection between the first edge and the third edge preferably forms an arcuate cutting edge by beveling one side of the blade.

28 Claims, 2 Drawing Sheets

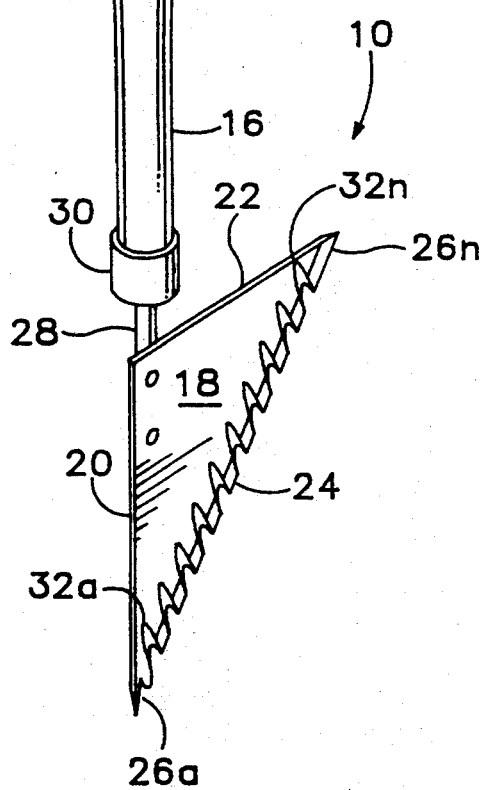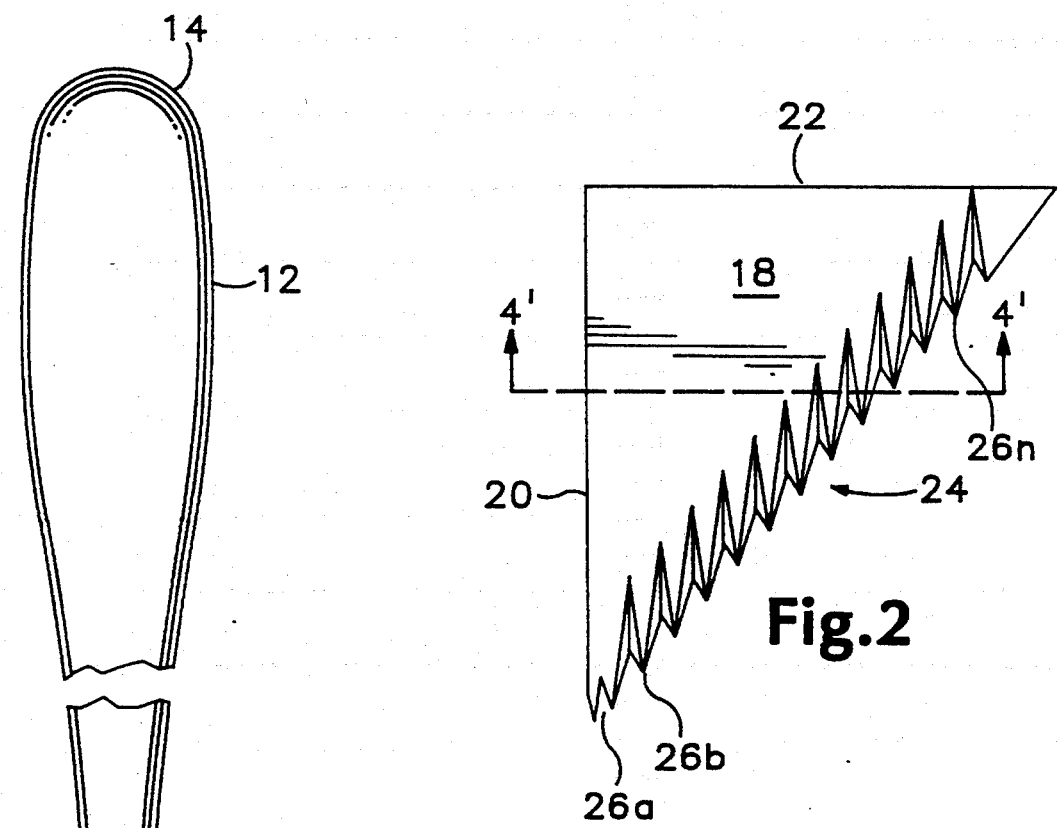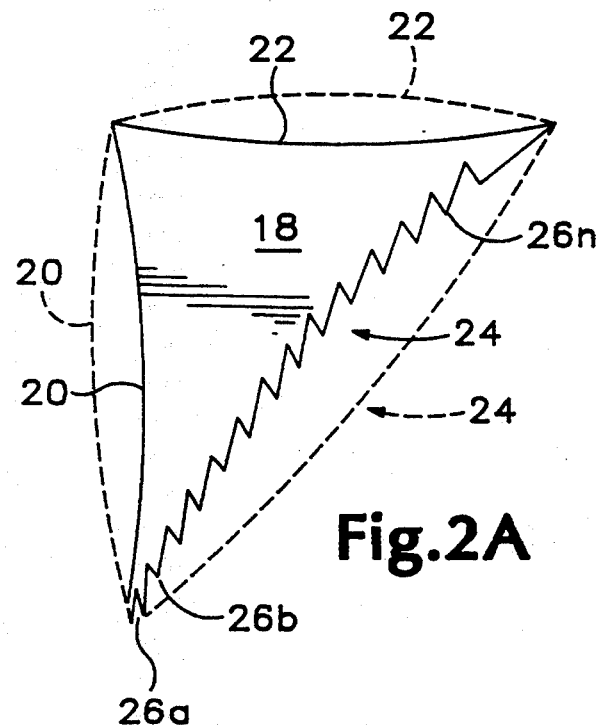

GARDEN TOOL

The present invention is, generally, a gardening tool and, in particular, is a sod cutter, a tool to loosen the soil, and to cut roots, and facilitate removal, of weeds and other unwanted plants.

BRIEF DESCRIPTION OF THE INVENTION

The present invention is a bladed tool intended for use as a sod cutter and edger, and in removing weeds and other unwanted plants from yards and gardens, and for breaking up the soil therein. It includes an elongated handle having upper and lower ends, with a blade having first, second and third edges thereon. The first edge of the blade is attached to the lower end of the handle. The second edge thereof extends laterally from the handle and the first edge, and the third edge of the blade extends generally diagonally downward and inward from the second edge to the first edge, forming a substantially triangular shape for the blade. The third edge is sharpened and has serrations therein with sharpened edges. At least one face of the blade has grooves therein extending substantially parallel to said first edge, with said grooves becoming shallower as the distance from the third edge increases.

BRIEF DESCRIPTION OF THE DRAWINGS

FIG. 1 is an oblique view of the present invention.

FIG. 2 is a plan view of the blade of the present invention.

FIG. 2A is a plan view of the blade of the present invention disclosing concave arcuate edges thereon (convex edges in dashed outline).

DETAILED DESCRIPTION OF THE PRESENT INVENTION

Figure 3A:
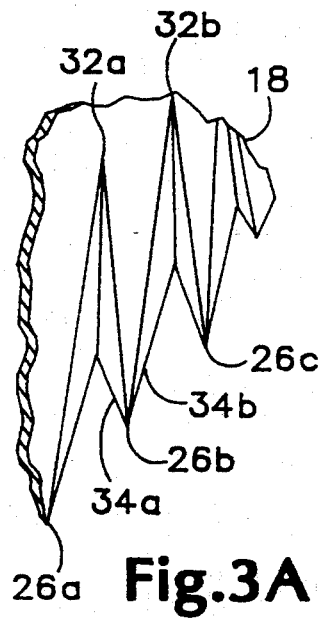
FIGS. 3A–3D disclose various embodiments of serrations of the blade of the present invention.

FIG. 1 is an oblique view of present invention 10, showing handle 12 having upper end 14 and lower end 16 thereon, and disclosing blade 18, having first edge 20, second edge 22, and third edge 24. First edge 20 is preferably somewhat longer than second edge 22. Third edge 24 is preferably sharpened on one side thereof and incorporates thereon serrations 26a . . . 26n. Serration 26a may be bifurcated as shown.

Blade 18 is attached to handle 12 by means of shank 28, which is attached at the corner of first edge 20 and second edge 22 in any of several ways well-known in the art, such as by bolting or riveting (as shown), welding, etc. Blade 14 and shank 28 could also be forged in one piece. Handle 12 could include ferrule 30 on second end 16 to help prevent splitting thereof during hard usage.

FIG. 2 is a plan view of blade 18, disclosing the various features thereof in greater detail. As indicated in greater detail in FIGS. 4A and 4B, diminishing grooves 32a . . . 32n extend upward, substantially parallel to first edge 20. The length of second edge 22 preferably is sufficient to accomodate the sole of a shoe, for the purpose of applying pressure sufficient to force blade 18 into the ground. Second edge 22 could include a stiffening flange to give added stiffness to blade 18, and to provide a larger area to press against in use. The material of blade 18 should be resistant to the abrasive effects of being forced into the ground, and sufficiently heavy to withstand the twisting and bending forces applied thereto.

As disclosed in FIG. 2A, any of first, second, and third edges 20, 22, and 24, respectively, could have a slight arcuate shape thereto, either concave, as shown, or convex (in dashed outline), whichever is more effective for particular conditions of use.

Figure 3B:
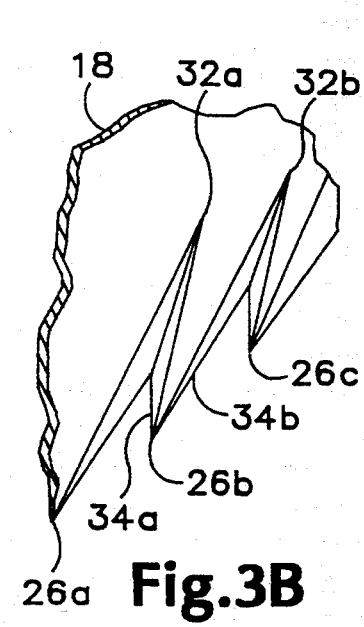
Figure 3C:
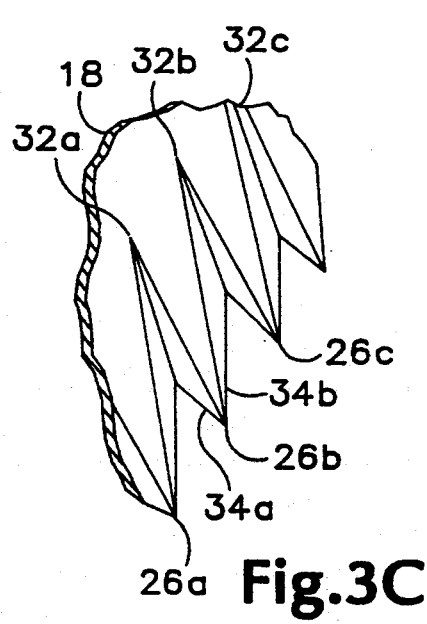

FIG. 3A–D disclose optional shapes of individual serrations 26a . . . 26n of blade 18, according to the cutting characteristics thereof. In FIG. 3A, leading edge 34a and trailing edge 34b each have a slant thereto, with respect to first edge 20. In FIG. 3B, leading edge 34a is substantially parallel to first edge 20 of blade 18, and trailing edge 34b is slanted. FIG. 3C discloses leading edge 34a slanted and trailing edge 34b substantially parallel to first edge 20.

Figure 3D:
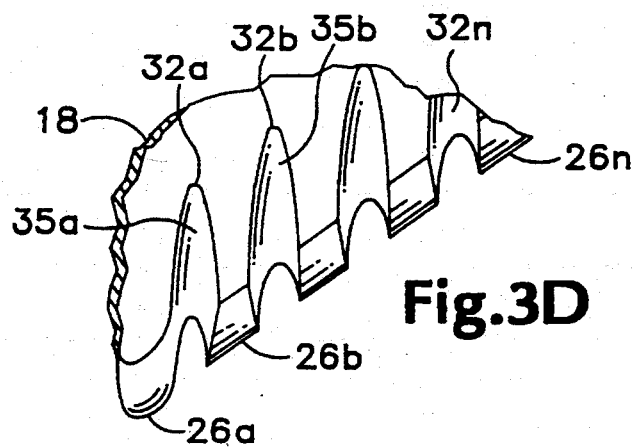

FIG. 3D discloses a preferable shape for serrations 26a . . . 26b, the serrations being formed by grooves 32a . . . 32n having smooth, concave tail extending upwardly in at least one face of blade 18, substantially parallel to first edge 20. The grooves become shallower as they extend away from third edge 24. As disclosed in FIG. 3D, the edge 24 of blade 18 defines the edge of teeth 26a . . . 26n. Edge 24 is sharpened, preferably at a substantially acute angle. Leading and trailing edges 34a and 34b, respectively, are preferably sharpened to increase the cutting efficiency of the tool.

The shapes of trailing and leading edges 34b and 34a, respectively, will depend upon the shape in cross-section of grooves 32a . . . 32n, e.g., triangularly-shaped grooves will give straight edges to the teeth, as in FIGS. 3A–3C, and circularly-shaped grooves will give a parabolic shape thereto, as in FIG. 3D. As can be seen from FIG. 3D, and FIG. 1, in one embodiment of the invention the serrations and tips thereof are at least as wide as the notches therebetween. Other groove shapes will give other shapes.

Figure 4A:
FIG. 4A–4C are views in cross-section of FIG. 2, along arrows '4'—'4' thereof, disclosing several shapes of grooves in the face of the blade.
Figure 4B:
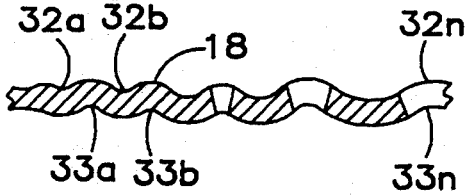

FIG. 4A is a view in cross-section of FIG. 2, along taken along arrows '4'—'4' thereof, disclosing grooves 32a . . . 32n. As can be seen from FIG. 4A, the serrations are bevelled on one side only of the blade to form the cutting edge. FIG. 4B discloses an alternate arrangement, where grooving is on both faces of blade 18, with grooves 32a . . . 32n on one face, and grooves 33a . . . 33b on the other face thereof. Grooves 32a . . .32b (and 33a . . . 33n), could be formed into blade 18 by stamping, machining, forging, or any other procedure well-known in the art.

Figure 4C:

FIG. 4C discloses a preferable shape in cross-section of grooves 32a . . . 32n with the serration shape as disclosed in FIG. 3D. As can be seen from FIG. 4C, the serrations are bevelled on one side only of the blade to form the cutting edge.

Those skilled in the art will see many modifications that could be made in the present invention without departing from the spirit or intent thereof. Some of these have already been described and/or disclosed. The terms and expressions which have been employed in the foregoing specification are used therein as terms of description and not of limitation, and there is no intention, in the use of such terms and expressions, of excluding equivalents of the features shown and described, or portions thereof, it being recognized that the scope of the invention is defined and limited only by the claims which follow.

We claim:

1. A garden tool, comprising:
an elongate handle having an upper end and a lower end; and
a blade having a first edge, a second edge and a third edge, said second edge extending away from said first edge and said third edge extending from said first edge to said second edge so as to define a substantially triangular shape to said blade, said third edge having a plurality of serrations, and said lower end of said handle being attached to said blade immediately adjacent said first edge so as to extend away from said second edge so that downward force applied to said second edge may be directed through the intersection of said first edge and said third edge with minimal lateral force on said handle.

2. The garden tool of claim 1, wherein said serrations each have a leading edge and a trailing edge, said leading edge being closest to said first edge of said blade and said trailing edge being a cutting edge.

3. The garden tool of claim 2, wherein said handle is fixedly attached to said blade substantially parallel to said first edge.

4. The garden tool of claim 3, wherein said serrations are separated by grooves in one face of said blade, said grooves extending from said third edge substantially parallel to said first edge.

5. The garden tool of claim 4, wherein said trailing edge has a portion thereof substantially parallel to said first edge.

6. The garden tool of claim 5, wherein said serrations are bevelled on one side only of said blade to form said cutting edge.

7. The garden tool of claim 2, wherein said trailing edge has a portion thereof substantially parallel to said first edge.

8. The garden tool of claim 7, wherein said serrations are bevelled on one side only of said blade to form said cutting edge.

9. The garden tool of claim 8, wherein said serrations extend substantially the entire length of said third edge.

10. The garden tool of claim 1, wherein said serrations are separated by grooves in one face of said blade, said grooves extending from said third edge substantially parallel to said first edge.

11. The garden tool of claim 10, wherein the intersection of said first edge and said third edge forms an arcuate cutting edge.

12. The garden tool of claim 1, wherein said handle is fixedly attached to said blade substantially parallel to said first edge.

13. The garden tool of claim 1, wherein said serrations are bevelled on one side of the blade only to form a cutting edge.

14. The garden tool of claim 1, wherein said serrations extend substantially the entire length of said third edge.

15. The garden tool of claim 1, wherein the intersection of said first edge and said third edge forms an arcuate cutting edge.

16. The garden tool of claim 1, wherein the first of said serrations is bifurcated.

17. The garden tool of claim 1, wherein said serrations each have a leading edge and a trailing edge, said leading edge being substantially parallel to said first edge.

18. The garden tool of claim 1, wherein said serrations each have a leading edge and a trailing edge, said leading and trailing edges being inclined with respect to said first edge.

19. A garden tool, comprising:
an elongate handle having an upper end and a lower end;
a blade having a first edge, a second edge, a third edge, and two opposing sides bordered by said edges, said second edge extending away from said first edge and said third edge extending from said first edge to said second edge so as to define a substantially triangular shape to said blade, said lower end of said handle being attached to said blade so as to extend away from said second edge; and
a plurality of serrations disposed along said third edge, said serrations each having a leading edge and a trailing edge, said leading edge being closest to said first edge of said blade and said trailing edge being a cutting edge, said serrations being formed by grooves in one side of said blade, said grooves having smooth, concave tails extending from said serrations toward said second edge substantially parallel to said first edge.

20. A garden tool, comprising:
an elongate handle having an upper end and a lower end;
a blade having a first edge, a second edge, a third edge, and two opposing sides bordered by said edges, said second edge extending away from said first edge and said third edge extending from said first edge to said second edge so as to define a substantially triangular shape to said blade, and said lower end of said handle being attached to said blade so as to extend away from said second edge; and
a plurality of serrations disposed along said third edge, said serrations each having a leading edge and a trailing edge, said leading edge being closest to said first edge of said blade and said trailing edge being a cutting edge, said serrations extending from adjacent the intersection of said first edge and third edge to adjacent the intersection of said second edge and third edge.

21. A garden tool, comprising:
an elongate handle having an upper end and a lower end;
a blade having a first edge, a second edge, a third edge, and two opposing sides bordered by said edges, said second edge extending away from said first edge and said third edge extending from said first edge to said second edge so as to define a substantially triangular shape to said blade, and said lower end of said handle being attached to said blade so as to extend away from said second edge; and
a plurality of serrations disposed along said third edge, said serrations each having a leading edge and a trailing edge, said leading edge being closest to said first edge of said blade and said trailing edge being a cutting edge, the intersection of said first edge and said third edge forming cutting point.

22. A garden tool, comprising:
an elongate handle having an upper end and a lower end;
a blade having a first edge, a second edge, a third edge, said second edge extending away from said first edge and said third edge extending from said first edge to said second edge so as to define a substantially triangular shape to said blade, and said lower end of said handle being attached to said blade so as to extend away from said second edge; and a plurality of serrations disposed along said third edge, said serrations being separated by grooves in one side of said blade which terminate at respective notches, said serrations terminating at respective tips, said serrations and respective tips being at least as wide as said notches.

23. The garden tool of claim 22, wherein said serrations each have a leading edge and a trailing edge, said leading edge being closest to said first edge of said blade and said trailing edge being a cutting edge.

24. The garden tool of claim 22, wherein said grooves extending from said third edge substantially parallel to said first edge.

25. The garden tool of claim 22, wherein said trailing edge has a portion thereof substantially parallel to said first edge.

26. The garden tool of claim 22, wherein said serrations are bevelled on one side of said blade only to form said cutting edge.

27. The garden tool of claim 22, wherein said trailing edge has a portion thereof substantially parallel to said first edge.

28. The garden tool of claim 22, wherein said serrations extend substantially the entire length of said third edge.

* * * * *